US011423576B1

(12) United States Patent
Corona et al.

(10) Patent No.: US 11,423,576 B1
(45) Date of Patent: Aug. 23, 2022

(54) INFRASTRUCTURE NODE LOCALIZATION WITH RESPECT TO ALTERNATIVE FRAME OF REFERENCE

(71) Applicant: FORD GLOBAL TECHNOLOGIES, LLC, Dearborn, MI (US)

(72) Inventors: Enrique Corona, Canton, MI (US); Mostafa Parchami, Ann Arbor, MI (US); Gaurav Pandey, College Station, TX (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/383,873

(22) Filed: Jul. 23, 2021

(51) Int. Cl.
*G06T 7/80* (2017.01)
*G06T 7/73* (2017.01)
*H04N 17/00* (2006.01)
*G01S 19/48* (2010.01)

(52) U.S. Cl.
CPC .............. *G06T 7/80* (2017.01); *G01S 19/485* (2020.05); *G06T 7/73* (2017.01); *H04N 17/002* (2013.01); *G06T 2207/30244* (2013.01)

(58) Field of Classification Search
CPC ... G06T 7/80; G06T 7/73; G06T 2207/30244; G01S 19/485; H04N 17/002
See application file for complete search history.

(56) References Cited

U.S. PATENT DOCUMENTS

| 8,452,080 | B2 | 5/2013 | Engedal |
| 9,508,146 | B2 | 11/2016 | Davies et al. |
| 9,560,345 | B2 * | 1/2017 | Grundhöfer ......... H04N 17/002 |
| 9,736,368 | B2 * | 8/2017 | Lablans ................ H04N 5/247 |
| 9,996,936 | B2 | 6/2018 | Arth et al. |
| 10,242,281 | B2 * | 3/2019 | Getz ........................ G01S 19/19 |
| 10,911,747 | B1 * | 2/2021 | Kiss ....................... G06V 20/58 |
| 11,036,241 | B2 * | 6/2021 | Zhou ....................... G01P 21/00 |
| 11,210,810 | B2 * | 12/2021 | Chen ..................... G01S 19/485 |
| 11,232,595 | B1 * | 1/2022 | Momcilovic ........ H04N 17/002 |
| 2016/0327653 | A1 * | 11/2016 | Humphreys ........... G01S 19/48 |
| 2017/0243399 | A1 * | 8/2017 | Troy ..................... G06T 19/003 |
| 2018/0302614 | A1 * | 10/2018 | Toksvig ............... G06K 9/6269 |
| 2020/0232799 | A1 * | 7/2020 | Parchami .............. G01S 17/931 |
| 2021/0048533 | A1 * | 2/2021 | Agarwal ................ G06T 17/00 |

(Continued)

FOREIGN PATENT DOCUMENTS

| CN | 110689579 A | 1/2020 |
| CN | 111531547 A | 8/2020 |
| EP | 3496039 A1 | 12/2019 |

*Primary Examiner* — Brian P Yenke
(74) *Attorney, Agent, or Firm* — Michael Spenner; Brooks Kushman P.C.

(57) ABSTRACT

A system includes a camera, a visual target including a GPS receiver, and a processor. The camera images the visual target at a plurality of locations to obtain a plurality of images. The processor receives GPS coordinates for each respective location. Also, the processor determines a 3D location of the visual target in a camera reference frame for each of the images. The processor derives a plurality of estimated GPS camera locations for each of the plurality of images and mitigates an error associated with each of the derived estimated GPS camera locations to derive an average GPS camera location. This location is used to determine and store a transformation usable to describe objects viewed by the camera in the camera reference frame in terms of the GPS reference frame.

18 Claims, 3 Drawing Sheets

(56) References Cited

U.S. PATENT DOCUMENTS

| | | | |
|---|---|---|---|
| 2021/0173094 A1* | 6/2021 | Chen | G06T 7/579 |
| 2021/0199479 A1* | 7/2021 | Lau | G01S 7/4086 |
| 2021/0264213 A1* | 8/2021 | Pandey | G06N 3/08 |
| 2021/0287393 A1* | 9/2021 | Warnaar | H04N 1/00204 |
| 2021/0350572 A1* | 11/2021 | Wang | G06V 20/13 |

* cited by examiner

INFRASTRUCTURE NODE LOCALIZATION WITH RESPECT TO ALTERNATIVE FRAME OF REFERENCE

TECHNICAL FIELD

The illustrative embodiments generally relate to infrastructure node localization with respect to an alternative frame of reference.

BACKGROUND

Installation and provision of robust infrastructure sensing elements, such as cameras, IR sensors, LIDAR sensors, etc., is an important step in the concept of a fully-connected network capable of supporting autonomous driving and smart-cities. With the vast amount of such installations that will need to be installed to obtain full visual and sensed coverage of common occurrences, such as intersections, any additional cost and tasks related to such installations scales dramatically. Similarly, any efficiencies that can be achieved also scale dramatically, making even small improvements in an overall plan represent potential massive savings of time and money.

One possible issue that these elements (the examples refer to cameras, but it is appreciated that the illustrative embodiments can extend to other sensors where appropriate) encounter is the need for calibration to an alternative frame of reference. That is, a camera may be able to determine, through image processing, where a detected element, such as a vehicle, is located within the camera's field of view, but such information may not be particularly useful to anything other than the camera, as a vehicle, for example, receiving such information, does not know the precise elevation, location and aiming (pose) of the camera. Even were it possible to provide such information to a vehicle, the vehicle would potentially then have to determine the correct transformation for every single element sending it data. Accordingly, significant processing resources and overhead can be saved by providing the information about detected objects to the vehicle in a frame of reference that the vehicle can automatically understand, such as GNSS or GPS coordinates. Then, the vehicle can determine a referential location (relative to the vehicle itself) of the sensed object with limited additional calculation. The impact of this is magnified at a single intersection, let alone across an entire route, when one considers that vehicles may be provided with information pertaining to multiple objects at every single intersection (e.g., each other vehicle, pedestrian, etc., which can be significant for a busy inner-city intersection).

Placement of infrastructure elements at similar heights and poses, as well as determining precise GNSS locations of such elements—in order to provide a common transform, for example—may not only be difficult, it may be virtually impossible. The illustrative embodiments provide an alternative solution that allows for rapid deployment and calibration (relatively speaking, at least) of such elements that can help ensure precision, and save significant time, effort and cost.

SUMMARY

In a first illustrative embodiment, a system includes a camera, a visual target including a GPS receiver, and a processor, in communication with the camera. The processor is configured to image the visual target at a plurality of locations to obtain a plurality of images. The processor is further configured to receive GPS coordinates for each respective location, based on the GPS coordinates detected by the GPS receiver at a given location. Also, the processor is configured to determine a 3D location of the visual target, relative to a 3D location of the camera, in a camera reference frame, for each of the images. The processor is additionally configured to derive a plurality of estimated GPS camera locations, based on the 3D location of the visual target relative to the 3D location of the camera in the camera reference frame for a given image, and based on the GPS coordinates associated with the visual target for a given GPS location for the given image, determine the location of the camera relative to the target in a GPS reference frame, for each of the plurality of images. Further, the processor is configured to mitigate an error associated with each of the derived estimated GPS camera locations to derive an average GPS camera location and determine and store a transformation based on the average GPS camera location, usable to describe objects viewed by the camera in the camera reference frame in terms of the GPS reference frame.

In a second illustrative embodiment, a method includes imaging a visual target at a plurality of locations using a camera to obtain a plurality of images. The method also includes receiving GPS coordinates for each respective location, based on GPS coordinates detected by a GPS receiver of the target at a given location and determining a 3D location of the visual target, relative to a 3D location of the camera, in a camera reference frame, for each of the images. The method further includes deriving a plurality of estimated GPS camera locations based on the 3D location of the visual target relative to the 3D location of the camera in the camera reference frame for a given image, and based on the GPS coordinates associated with the visual target for a given GPS location for the given image, determine the location of the camera relative to the target in a GPS reference frame, for each of the plurality of images. Further, the method includes mitigating an error associated with each of the derived estimated GPS camera locations to derive an average GPS camera location. Additionally, the method includes determining and storing a transformation based on the average GPS camera location, usable to describe objects viewed by the camera in the camera reference frame in terms of the GPS reference frame.

In a third illustrative embodiment, a non-transitory storage medium stores instructions that, when executed by a processor, cause the processor to perform a method including imaging a visual target at a plurality of locations using a camera to obtain a plurality of images. The method also includes receiving GPS coordinates for each respective location, based on GPS coordinates detected by a GPS receiver of the target at a given location and determining a 3D location of the visual target, relative to a 3D location of the camera, in a camera reference frame, for each of the images. The method further includes deriving a plurality of estimated GPS camera locations based on the 3D location of the visual target relative to the 3D location of the camera in the camera reference frame for a given image, and based on the GPS coordinates associated with the visual target for a given GPS location for the given image, determine the location of the camera relative to the target in a GPS reference frame, for each of the plurality of images. Further, the method includes mitigating an error associated with each of the derived estimated GPS camera locations to derive an average GPS camera location. Additionally, the method includes determining and storing a transformation based on the average GPS camera location, usable to describe objects viewed by the camera in the camera reference frame in terms of the GPS reference frame.

DETAILED DESCRIPTION

Figure 1:
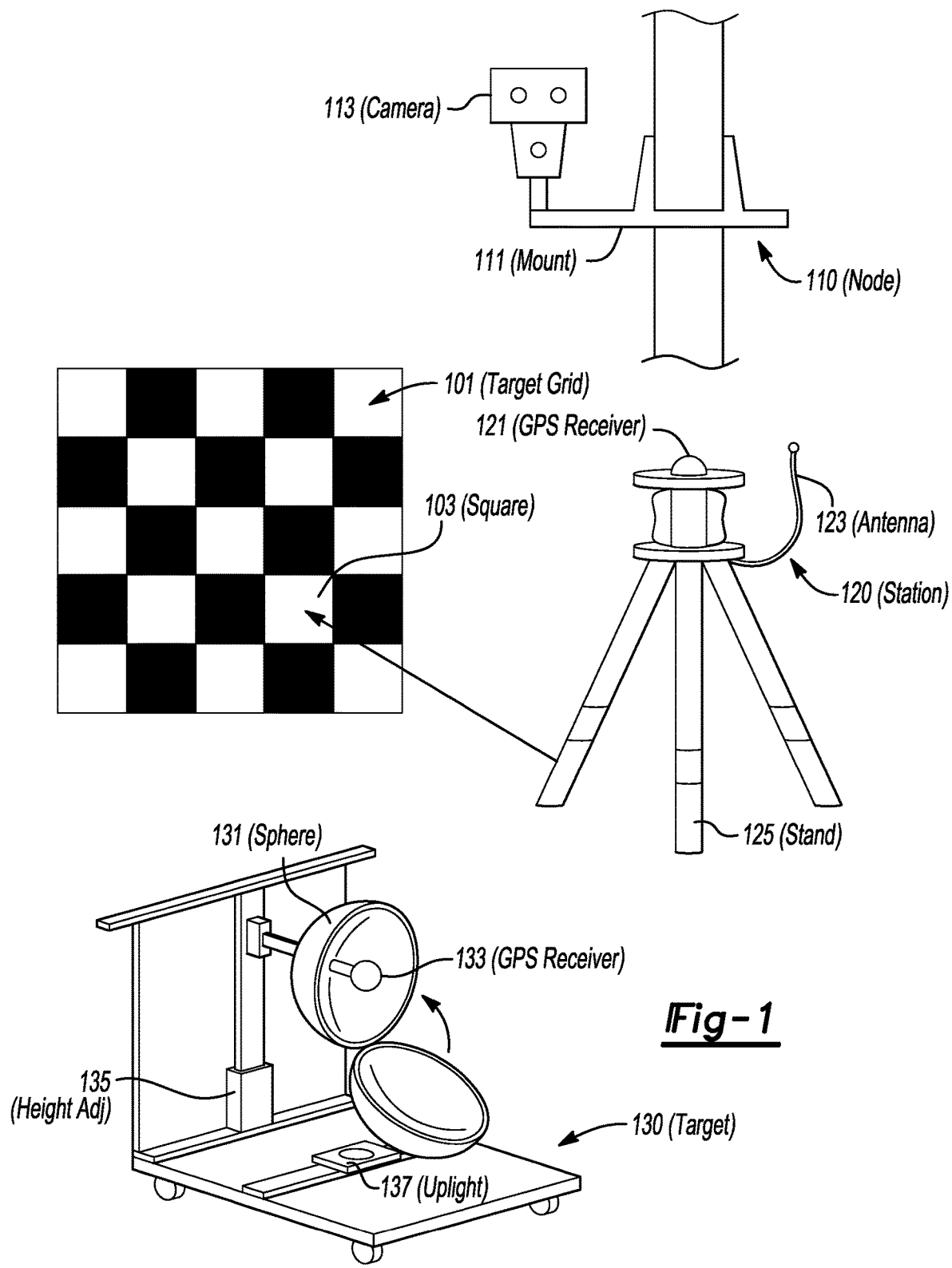
FIG. 1 shows an illustrative example of elements of several alternative calibration processes.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments, particular components of the VACS may perform particular portions of a process depending on the particular implementation of the system. By way of example and not limitation, if a process has a step of sending or receiving information with a paired wireless device, then it is likely that the wireless device is not performing that portion of the process, since the wireless device would not "send and receive" information with itself. One of ordinary skill in the art will understand when it is inappropriate to apply a particular computing system to a given solution.

Execution of processes may be facilitated through use of one or more processors working alone or in conjunction with each other and executing instructions stored on various non-transitory storage media, such as, but not limited to, flash memory, programmable memory, hard disk drives, etc. Communication between systems and processes may include use of, for example, Bluetooth, Wi-Fi, cellular communication and other suitable wireless and wired communication.

In each of the illustrative embodiments discussed herein, an exemplary, non-limiting example of a process performable by a computing system is shown. With respect to each process, it is possible for the computing system executing the process to become, for the limited purpose of executing the process, configured as a special purpose processor to perform the process. All processes need not be performed in their entirety, and are understood to be examples of types of processes that may be performed to achieve elements of the invention. Additional steps may be added or removed from the exemplary processes as desired.

With respect to the illustrative embodiments described in the figures showing illustrative process flows, it is noted that a general purpose processor may be temporarily enabled as a special purpose processor for the purpose of executing some or all of the exemplary methods shown by these figures. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

Infrastructure elements play a role in the context of smart cities in a smart world framework. Infrastructure nodes (IX nodes) include sensor heads mounted in strategic locations where they can perceive the environment and relay information to other IX nodes or to vehicles. Autonomous vehicles may particularly benefit from such information, as it may let the vehicle see around a corner that vehicle sensors may not otherwise be able to see around. Also, since the IX node has a fixed location in space, relativistic determinations about locations of objects (relative to the node location) can be contemplated without fear of significant error in evaluation and in a consistent reference frame.

For example, even if vehicles detected other object and reported the locations of those other objects to other vehicles, which they likely will, the location of the object can most easily be determined relative to the location of the detecting vehicle, in many cases. That is, the vehicle may generally know where it is located, and may be able to determine a relative location of another object, but the vehicle's own location may be imprecise, and may also be constantly changing. A fixed IX node will not change location and can more easily track and report the relative locations of detected objects (e.g., vehicles, pedestrians, etc.) without as much potential variance.

In order to provide relatively accurate information about a viewed-scene, in terms of locations of objects, it is useful to know a reasonably precise GPS location of the camera. Obtaining this for thousands or hundreds of thousands of IX nodes could involve the inclusion of expensive GPS devices in those nodes, whose primary purpose would be to establish the initial (and likely not-to-change) location of the node. The illustrative embodiments propose an alternative approach, wherein the camera can view an object at a number of known locations, and then determine the location of the camera based on the locations of the viewed object. This includes determining the pose of the camera, so that future objects detected by the camera can be reported within the GPS reference frame by use of a transformation, knowing the location and pose of the camera with respect to the GPS reference frame.

FIG. 1 shows an illustrative example of elements of several alternative calibration processes. This example shows an image of a checkerboard target 101, which can be laid out in view of the camera 113, which is part of an IX node 110, such as a node mounted 111 to a pole or building.

A target GNSS device, such as a mobile GPS base station 120 can be placed within the center of a checkerboard square 103. This GPS device 120 is used to estimate the GPS location of the checkerboard target 101. The GPS device can use a mobile GPS base-station 121 to get accurate GPS measurements FIG. 1 also shows an alternative version of the target 130, which includes a hollow sphere 131 and a central GPS receiver 133. The sphere can be height adjusted to a known height based on height adjustment mechanism 135 and may further include illumination provided by uplight 137. The use of the sphere is discussed in greater detail with regards to FIGS. 2 and 3.

When device 120 is used in conjunction with grid 101, it is possible to estimate the position of the IX node camera (in this example) in the GPS reference frame, through a series of images taken by the camera 113. The device 120 is placed in the center of a grid square 103, and then an image of the grid and knowledge that the device 120 is in the center of the square provides the location of the device 120 within the target frame, without complicated image processing to extract the image of the device 120 and locate it within the frame. The GPS location of the device 120 is also known based on the signal received by the GPS receiver 123.

Then, for a given observation made by the IX node camera 113, it is possible to obtain the position of the camera 113 within the GPS reference frame by:

$$^{G}X_C = {^{G}X_T} \oplus {^{T}X_C}$$

Where $^{T}X_C$ is the 6 degree of freedom (6-DOF) pose of the camera ([tx, ty, tx, rx, ty, rz]) with respect to the calibration target reference frame (T) (which can be obtained from an off-the-shelf camera calibration toolbox), $^{G}X_T$ is the 6-DOF pose of the calibration target in the GPS reference frame (T) (which can be obtained from direct GPS observation and the fact that the GPS antenna is attached to a known location with respect to the calibration target frame) and $^{G}X_C$ is the desired pose of the camera in the GPS reference frame (the pose to-be-determined). The measured values $^{T}X_C$ and $^{G}X_T$ may have some error, so a single measurement may actually only provide:

$$^{G}X_C = {^{G}X_T} \oplus {^{T}X_C} + e$$

With multiple observations of the target placed in various grid coordinates 103, the transformation $^{G}X_C$ can be estimated by minimizing the sum of squared error (e):

$$^{G}X_C = \arg\min \Sigma_{i=1\ldots n} \| {^{G}X_C} - {^{G}X_{Ti}} \oplus {^{Ti}X_C} \|^2$$

The pose concatenation operation ⊕ for a 2D reference frame defined by [tx, ty, φ] describes the relationship between two frames $X_{ik}$ and $X_{jk}$ as $$X_{jk} = X_{ij} \oplus X_{jk} = \begin{bmatrix} x_{jk}\cos\phi_{ij} - y_{jk}\sin\phi_{ij} + x_{ij} \\ x_{jk}\sin C_{ij} + y_{jk}\cos\phi_{ij} + y_{ij} \\ \phi_{ij} + \phi_{jk} \end{bmatrix}$$

Thus, using the above concatenation for the reference frames for the Camera frame (C) and the Target (GPS) frame (T) it is possible to obtain the pose of the camera in the GPS reference frame and thus derive a transformation that can be used to describe any object detected by the camera (in the future) in the GPS reference frame. That data can then be conveyed to a vehicle, for example, so that the vehicle knows the GPS location of the object based on observation of the object by the camera.

Figure 2:
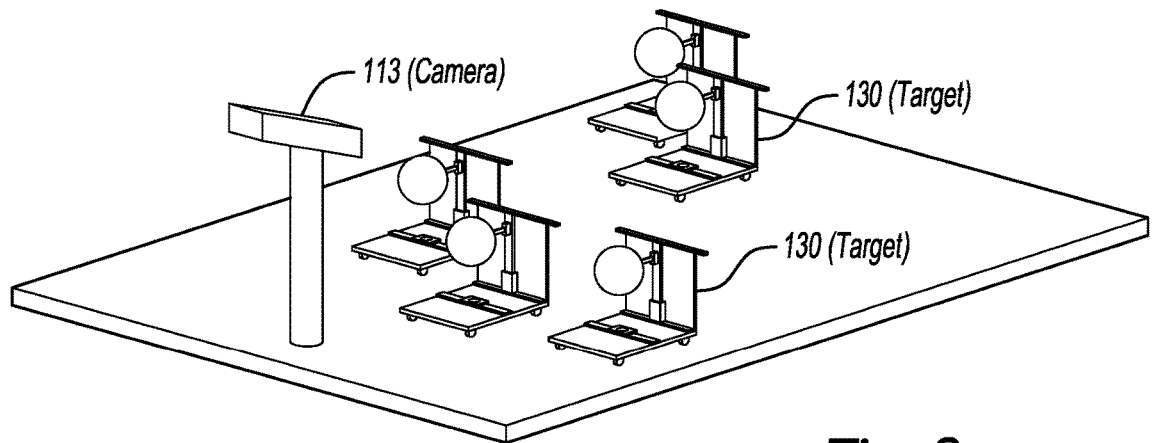
FIG. 2 shows an alternative calibration technique using a hollow sphere.

FIG. 2 shows an alternative calibration technique using a hollow sphere 131. Again, as shown in FIG. 1, the sphere 131 is height adjustable via mechanism 135. The sphere platform 130 can be wheeled to different locations within a camera 113 frame, allowing for multiple images of the sphere 131 to be obtained, each with its own set of GPS coordinates derived from the GPS transceiver at the center of the sphere. The sphere being hollow and hinged allows for receipt of GPS coordinates without fear of interference, and when closed, the camera can determine the location of the GPS coordinate point relative to the image of the sphere because the coordinate point correlates to the center of the sphere, which is determinable when the exterior of the sphere is imaged.

Figure 3:
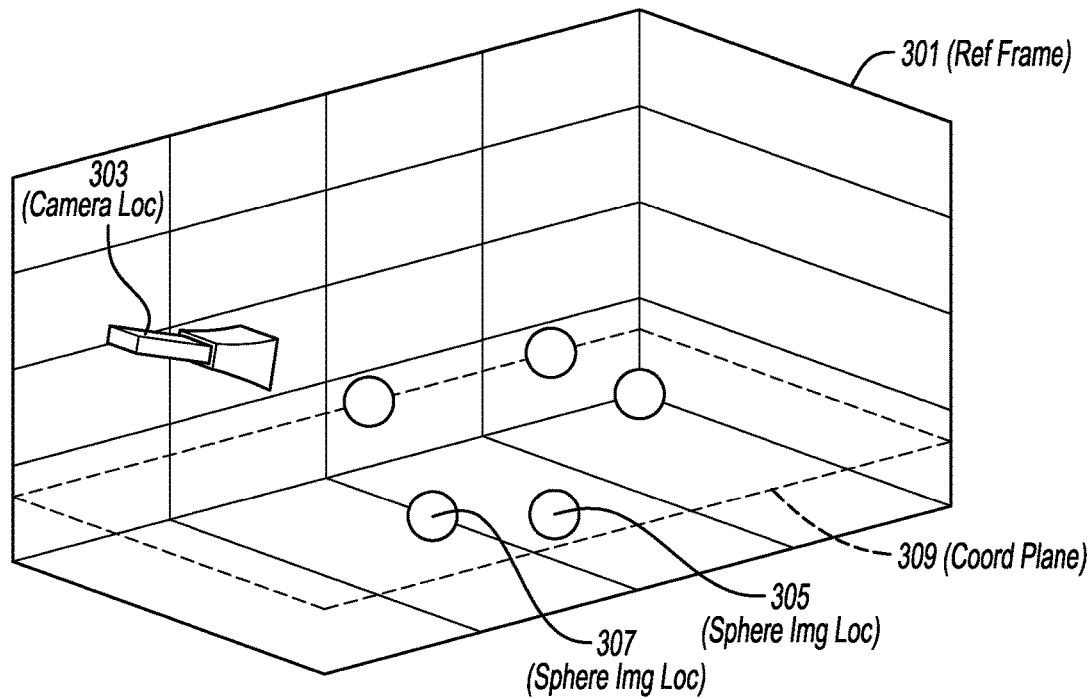
FIG. 3 shows an illustrative transformation of detected-spheres into a reference frame.

FIG. 3 shows an illustrative transformation of detected-spheres into a reference frame. This is an example of multiple sphere images 305, 307 in the GPS frame (represented by coordinate plane 309), placed in the camera frame 301 based on relative position of the image to the camera 303. These sphere locations can then be used, in manners similar to that described above, to derive the location of the camera in the GPS reference frame, which is effectively the distance from the camera to the sphere, were the camera on the same plane as the sphere, and at a relative direction to the sphere. Put another way, if one were to draw a right triangle using the location of the camera and center of the sphere as two intersections, and with the right angle at the base of the camera at the height of the sphere center, the offset (the GPS location of the camera) would be the distance of the leg that is in the plane of the sphere including directionality from the sphere center to the camera base (when dropped to the plane of the sphere). Thus, by knowing the 3D location of the sphere center in the 3D camera reference frame, and knowing the 2D coordinate location of the sphere in the GPS reference frame, the directionality and length of the leg can be determined in the 3D reference frame and the offset it represents can be used in the 2D reference frame to determine the distance and direction of the camera from the sphere (in 2D coordinates).

Since there may still be some degree of error, and because precision is desired, the techniques for error mitigation over multiple images of the sphere can be useful to alleviate the effect of error occurring from a single measurement.

In another way of approaching the concept, if one obtained the distance from the camera (mount) to each sphere center, and one knew the height of the camera mount relative to the height of the sphere center, then one could derive the length of the leg of that triangle sitting within the GPS frame. In this manner, directionality need not necessarily be known, as one could alternatively draw circles lying in the plane of the sphere around the center of the sphere with radius=the length of the leg, and where those circles overlapped (for multiple images 305, 307) would be the location of the camera mount in the GPS reference frame. Accordingly, different techniques could be used based on which data is known, knowable or most cost-effective.

Thinking about the solution from this perspective, the error in calculation would essentially create a small geometric space around the true overlap point, and error mitigation attempts to find the approximate center of that space.

Figure 4:
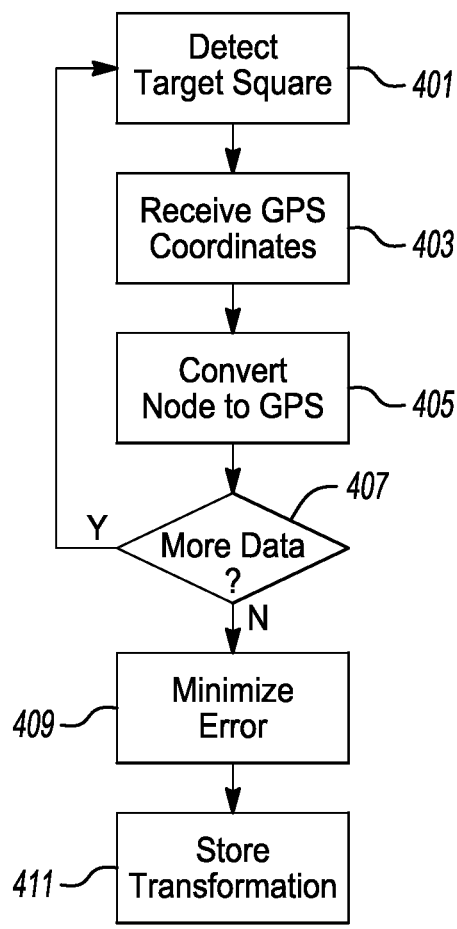
FIG. 4 shows an illustrative calibration process using a GPS-target.

FIG. 4 shows an illustrative calibration process using a GPS-target. In this example, the process uses a GPS target located at the center of a checkerboard grid square. It will be incumbent on the operator to place the target as near to the center of the square as possible, as the camera 113 will view the square and use the center as the location of the target, since it may be difficult to otherwise derive the exact location of the GPS antenna (the reception point) within the camera field of view. Using the checkerboard allows for a visually discernable location whose center can be easily calculated. Since the sphere is itself a visually discernable object, and since the center of a sphere is knowable by observing the sphere, which the camera can cleanly detect, the checkerboard is not required to be used with the sphere embodiments. In this manner, the target can effectively be any visually discernable object wherein the location of a point of the object (the GPS reception point) is knowable based on observation of the object. A sphere may be suitable because shadows and other visual artifacts may not visually distort an apparent edge or side (in the way that, say, a cube could appear different from how the cube is arranged), but as long as the camera was able to repeatedly and consistently discern the parameters required for determining the location of the GPS reception point, then any object could effectively be used.

In embodiments where the height of the object is desired to be known, the object may be affixed to a height adjustable platform. It is also worth noting that even if the height of the camera is known (from the ground), the height of the object from the ground is not necessarily entirely useful unless there is an assurance that the ground at both points is the same level above sea-level. Accordingly, embodiments that rely on a triangulation concept based on relative heights and distances to the camera along a hypotenuse may be difficult unless the camera height is known from the plane on which the object sits. Thus, solutions that rely on the distance from the camera to the object (hypotenuse) and derive both legs of the triangle from this information based on the acute angles of the right triangle formed by the camera, the center and a line from the center to the base of the camera along the plane of the center, may be more universally applicable and easier to enact.

In this example, the camera 113 detects a target square at 401, and determines the location of the center of the square, which is where the GPS reception point should be located. The processor responsible for determining the location of the camera and the transformation may also receive the GPS coordinates of the reception point, thus allowing the processor to know the GPS coordinates of the center of the square, assuming the reception point is centered in the square.

Using the concatenation process (⊕) described above, an estimated position of the camera in the GPS reference frame can be derived at 405. If multiple data points are desired at 407, to reduce the error in a single or too few calculations, additional data may be gathered until sufficient data points are known. Error mitigation is then performed at 409, and location of the camera 113 in the GPS reference frame is then known. This location can be used for a transformation related to any object viewed in the camera frame, to translate the object to the GPS reference frame, and thus the transformation may be stored at 411, allowing for fast conversion of viewed objects into a frame of reference usable by a vehicle that relies on the GPS reference frame.

Figure 5:
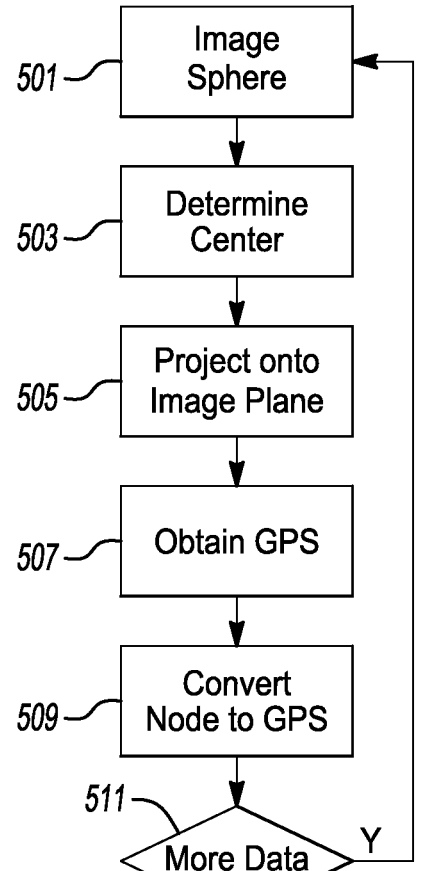
FIG. 5 shows an illustrative calibration process using a sphere.

FIG. 5 shows an illustrative calibration process using a sphere. Similar to the other process, this process obtains an image of the sphere 131 from the camera 113. The sphere is a recognizable object with regular geometry, and the GPS receiver is located at the sphere's center, so the coordinates of the receiver are the coordinates of the center of the sphere. The camera can image the sphere at 501 and place the image in a coordinate reference frame (of the camera) at 505. The camera processing can also determine sphere center at 503, based on the sphere's known geometry, and thereby obtain the GPS coordinates to be associated with the sphere at 507, usable in the concatenation process. This data can then be used at 509 to determine the location of the camera in the GPS reference frame, based on the concatenation using the sphere center coordinates as the reference point.

As with the other target, there will likely be a small margin of error associated with the calculations from the concatenation, so the process will determine at 511 if additional data elements are needed. As needed, the process can obtain additional images of the sphere, after the sphere has been moved each time, to obtain additional calculations, which can then be error adjusted as previously described or in another suitable manner at 513. The resulting calculation will then represent the average location of the camera in the GPS reference frame, which can be used to store a transformation at 515. As before, this transformation is usable to convert images viewed by the camera into the GPS reference frame, for conveyance to vehicles and other objects which use the GPS reference frame for their determinations about object location.

Figure 6:
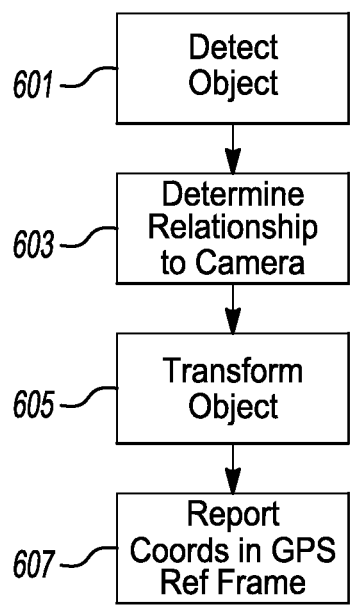
FIG. 6 shows an illustrative transformation process for viewed-objects.

FIG. 6 shows an illustrative transformation process for viewed-objects. This is an example of a process whereby the camera 113 detects an object in a field of view, after having been calibrated and assigned GPS coordinates based on the concatenation. Those coordinates are usable to derive the locations of viewed-objects in the GPS reference frame, through a transformation based on the location of the camera in the GPS reference frame and the relative position of the object to the camera.

After the camera views the object at 601, the location of the object relative to the location of the camera is determined at 603, using the transformation based on the camera GPS coordinates and the camera's own 3D reference frame.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A system comprising:
   a camera;
   a visual target including a GPS receiver; and
   a processor, in communication with the camera and configured to:
   image the visual target at a plurality of locations to obtain a plurality of images;
   receive GPS coordinates for each respective location, based on the GPS coordinates detected by the GPS receiver at a given location;
   determine a 3D location of the visual target, relative to a 3D location of the camera, in a camera reference frame, for each of the images;
   based on the 3D location of the visual target relative to the 3D location of the camera in the camera reference frame for a given image, and based on the GPS coordinates associated with the visual target for a given GPS location for the given image, determine the location of the camera relative to the target in a GPS reference frame, for each of the plurality of images, to derive a plurality of estimated GPS camera locations;
   mitigate an error associated with each of the derived estimated GPS camera locations to derive an average GPS camera location; and
   determine and store a transformation based on the average GPS camera location, usable to describe objects viewed by the camera in the camera reference frame in terms of the GPS reference frame.

2. The system of claim 1, wherein the visual target includes a hollow, hinged sphere.

3. The system of claim 2, wherein the GPS receiver is located at the center of the sphere.

4. The system of claim 1, wherein the processor is further configured to:
   detect an object other than the visual target using the camera;
   apply the stored transformation to an object other than the visual target detected using the camera to describe a location of the object in the GPS reference frame; and
   report the location of the object in the GPS reference frame to a requesting entity.

5. The system of claim 1, wherein:
   the visual target includes a stand; and
   the system includes a ground-deployed checkerboard.

6. The system of claim 5, wherein the processor is configured to:
   image the visual target by imaging a square of the checkerboard in which the visual target is deployed; and
   determine a center-point of the square as the location of the visual target in the camera reference frame.

7. A method comprising:
   imaging a visual target at a plurality of locations using a camera to obtain a plurality of images;
   receiving GPS coordinates for each respective location, based on GPS coordinates detected by a GPS receiver of the target at a given location;
   determining a 3D location of the visual target, relative to a 3D location of the camera, in a camera reference frame, for each of the images;
   based on the 3D location of the visual target relative to the 3D location of the camera in the camera reference frame for a given image, and based on the GPS coordinates associated with the visual target for a given GPS location for the given image, determine the location of the camera relative to the target in a GPS reference frame, for each of the plurality of images, to derive a plurality of estimated GPS camera locations;
   mitigating an error associated with each of the derived estimated GPS camera locations to derive an average GPS camera location; and
   determining and storing a transformation based on the average GPS camera location, usable to describe objects viewed by the camera in the camera reference frame in terms of the GPS reference frame.

8. The method of claim 7, wherein the visual target includes a hollow, hinged sphere.

9. The method of claim 8, wherein the GPS receiver is located at the center of the sphere.

10. The method of claim 7, further comprising:
    detecting an object other than the visual target using the camera;
    applying the stored transformation to an object other than the visual target detected using the camera to describe a location of the object in the GPS reference frame; and
    reporting the location of the object in the GPS reference frame to a requesting entity.

11. The method of claim 7, wherein:
    the visual target includes a stand; and
    the system includes a ground-deployed checkerboard.

12. The method of claim 11, further comprising:
    imaging the visual target by imaging a square of the checkerboard in which the visual target is deployed; and
    determining a center-point of the square as the location of the visual target in the camera reference frame.

13. A non-transitory storage medium storing instructions that, when executed by a processor, cause the processor to perform a method comprising:
    imaging a visual target at a plurality of locations using a camera to obtain a plurality of images;
    receiving GPS coordinates for each respective location, based on GPS coordinates detected by a GPS receiver of the target at a given location;
    determining a 3D location of the visual target, relative to a 3D location of the camera, in a camera reference frame, for each of the images;
    based on the 3D location of the visual target relative to the 3D location of the camera in the camera reference frame for a given image, and based on the GPS coordinates associated with the visual target for a given GPS location for the given image, determine the location of the camera relative to the target in a GPS reference frame, for each of the plurality of images, to derive a plurality of estimated GPS camera locations;
    mitigating an error associated with each of the derived estimated GPS camera locations to derive an average GPS camera location; and
    determining and storing a transformation based on the average GPS camera location, usable to describe objects viewed by the camera in the camera reference frame in terms of the GPS reference frame.

14. The storage medium of claim 13, wherein the visual target includes a hollow, hinged sphere.

15. The storage medium of claim 14, wherein the GPS receiver is located at the center of the sphere.

16. The storage medium of claim 13, the method further comprising:
    detecting an object other than the visual target using the camera;

applying the stored transformation to an object other than the visual target detected using the camera to describe a location of the object in the GPS reference frame; and reporting the location of the object in the GPS reference frame to a requesting entity.

17. The storage medium of claim 13, wherein:

the visual target includes a stand; and the system includes a ground-deployed checkerboard.

18. The storage medium of claim 17, the method further comprising:

imaging the visual target by imaging a square of the checkerboard in which the visual target is deployed; and determining a center-point of the square as the location of the visual target in the camera reference frame.

* * * * *